US007757916B1

(12) United States Patent
Petrie et al.

(10) Patent No.: US 7,757,916 B1
(45) Date of Patent: Jul. 20, 2010

(54) LOAD CARRIER ARRANGEMENT FOR A TRUCK BED

(75) Inventors: Aidan Petrie, Jamestown, RI (US); Michael Vieira, Fall River, MA (US)

(73) Assignee: Thule Sweden AB, Hillerstorp (SE)

( * ) Notice: Subject to any disclaimer, the term of this patent is extended or adjusted under 35 U.S.C. 154(b) by 275 days.

(21) Appl. No.: 10/637,001

(22) Filed: Aug. 8, 2003

Related U.S. Application Data (60) Provisional application No. 60/401,809, filed on Aug. 8, 2002.

(51) Int. Cl.
*B60R 9/00* (2006.01)
(52) U.S. Cl. .................... 224/403; 224/551; 403/109.1; 296/3
(58) Field of Classification Search .............. 224/403, 224/405, 551, 402, 495, 505, 320, 521, 500; 296/3; 248/354.5, 125.8, 407, 408; 403/109.1, 403/109.5, 109.6, 379.5
See application file for complete search history.

(56) References Cited

U.S. PATENT DOCUMENTS

| | | | | | |
|---|---|---|---|---|---|
| 1,179,391 | A | * | 4/1916 | Bachman | ..................... 182/204 |
| 2,417,646 | A | * | 3/1947 | Hallner | ..................... 280/478.1 |
| 3,284,101 | A | * | 11/1966 | Eston | ..................... 280/482 |
| 3,933,222 | A | * | 1/1976 | Craig, Jr. | ..................... 182/204 |
| 4,057,182 | A | * | 11/1977 | Kolkhorst et al. | ..................... 224/403 |
| 4,239,440 | A | * | 12/1980 | James | ..................... 414/542 |
| 4,345,734 | A | * | 8/1982 | Studinger | ..................... 248/669 |
| 4,405,170 | A | * | 9/1983 | Raya | ..................... 296/10 |
| 4,761,092 | A | * | 8/1988 | Nakatani | ..................... 403/104 |
| 5,439,152 | A | * | 8/1995 | Campbell | ..................... 224/405 |
| 5,476,301 | A | * | 12/1995 | Berkich | ..................... 296/3 |
| 5,570,825 | A | * | 11/1996 | Cona | ..................... 224/495 |
| 5,628,540 | A | * | 5/1997 | James | ..................... 296/3 |
| 5,692,791 | A | * | 12/1997 | Sulzer | ..................... 296/3 |
| 5,897,126 | A | * | 4/1999 | Morris | ..................... 280/491.5 |
| 6,017,008 | A | * | 1/2000 | Farley | ..................... 248/229.21 |
| 6,517,134 | B2 | * | 2/2003 | Armstrong | ..................... 296/3 |
| 6,575,344 | B2 | * | 6/2003 | Nusbaum | ..................... 224/525 |

* cited by examiner

*Primary Examiner*—Justin M Larson
(74) *Attorney, Agent, or Firm*—Novak Druce + Quigg LLP (57) ABSTRACT

Method and arrangement for providing a load carrier mountable on a carrying vehicle. The arrangement includes an elevating structure arranged between a base portion and a load supporting portion. The elevating structure is adapted to expand and contract between raised and lowered configurations. The elevating structure includes two substantially upright members, each of which is slidably moveable relative to the other for establishing the raised and lowered configurations. A fixing device is provided for releasably fixing the two sliding members one to the other. The fixing device includes a blocking member that is insertible in aligned receivers, one each of the aligned receivers being formed in each of the two sliding members for preventing expansion and contraction of the elevating structure. The fixing device further includes a take-up arrangement that is configured to press one of the two upright members against the other thereby forming a releasable friction fit therebetween.

19 Claims, 7 Drawing Sheets

LOAD CARRIER ARRANGEMENT FOR A TRUCK BED

CROSS-REFERENCE TO RELATED APPLICATIONS

The present application claims priority to U.S. Provisional Application No. 60/401,809 filed Aug. 8, 2002. Said application is expressly incorporated herein by reference in its entirety.

BACKGROUND

Load carriers, and particularly sports equipment carriers, are popularly mounted above the carrying vehicle for obvious reasons; among those reasons is the fact that roof top mounting positions the load above the driver and therefore out of the driver's line of sight. Known load carriers are configured to be installed in the bed of a truck; particularly into the beds of pickup style trucks that are commonly used as private vehicles. A fundamental problem arises when designing carriers that span the cab and bed of such pickup styled vehicles because of the extreme elevational differences between the roof of the truck cab and the bed of the truck. Since it is desirable in most situations to keep such load carriers and their transported cargo in substantially horizontal orientations, the need for arrangements that can "level" the load supporting portions of the load carrier arrangements has been recognized and answered via the present invention.

DESCRIPTION OF THE INVENTION

Illustrative FIGS. 1-14 showing an exemplary embodiment of the present invention, and collectively disclosing several separable aspects or features of the invention, are included herewith and are described and explained herein. Though not shown, it should be appreciated that the exemplary embodiment depicted in the drawings is configured to be installed on a pickup truck styled carrying vehicle. It should be further appreciated, however, that the separate aspects described with respect to the invention can in most cases be individually utilized in environments outside that of the load carrier arts. In the illustrated case, the load carrier environment should be assumed and more particularly, the illustrated apparatus comprises a portion of a rack carrier system that is installed at the bed of such a pickup styled truck.

During the invention's use in this environment, a complementary arrangement in addition to that which is shown will typically also be employed above the cab portion of the pickup truck. This complementary arrangement, together with the illustrated arrangement, establishes a two-cross-bar rack system of a nature that is common to known carrier rack designs. The configuration of this above-cab cross-bar and the support therefore can be substantially identical to presently available raised cross-bar arrangements that are employed on passenger vehicles.

As explained above, the fact that the upper most portions of the bed of a pickup truck is substantially below the roof top of the cab of the truck has presented a unique challenge to load carrier designers. More particularly, the question arises as to how to compensate for the extreme difference in elevation between the cab's roof-top and the much lower portions of the truck's bed, including the upper most portions of the bed which are typically the top surfaces of the side walls or rails. This problem is enhanced by the fact that not all pickup trucks are similarly dimensioned. In fact, in the personal vehicle market, there is a wide range of pickup truck sizes and configurations available to the consumer. Responsively, this solution to the elevational variances between the roof and bed of the truck preferably also includes structure and function for adapting the same basic load carrier design to differently sized pickup trucks.

Figure 3:
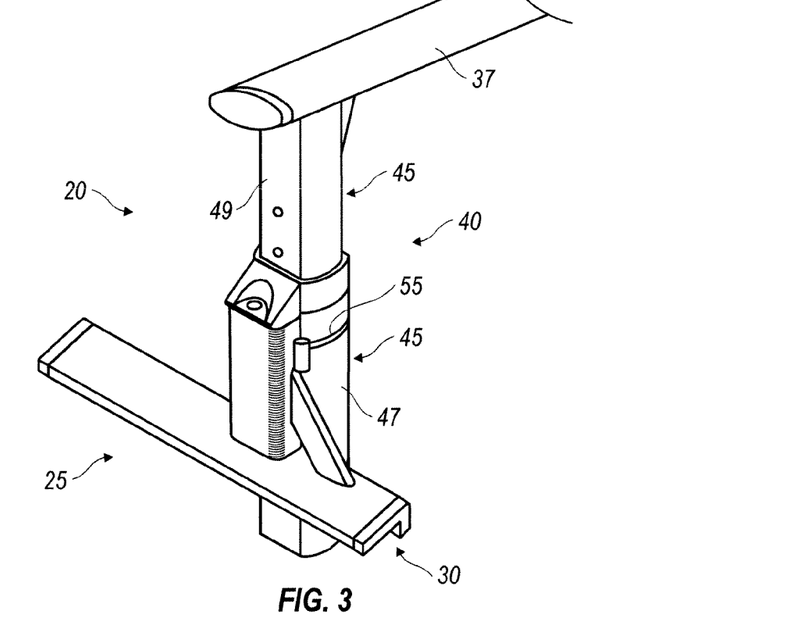
Figure 4:
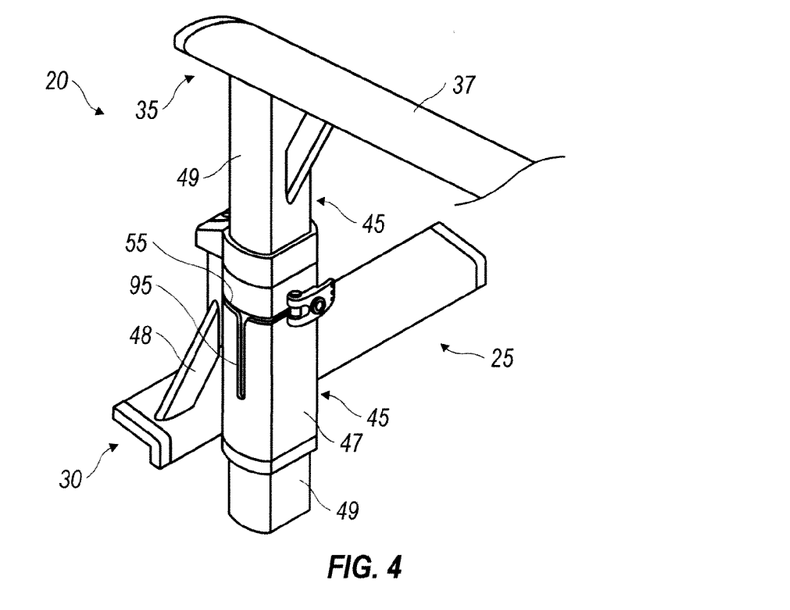

The present invention enables such solutions. Referring to FIGS. 3 and 4, a broken away portion of the load carrier arrangement 20 intended to be mounted at the bed of a pickup truck is shown. Essentially, one-half of the elevating structure 40 for a crossbar is shown. The base portion 25 and load supporting portion 35 between which the elevating structure is positioned are also shown. The base portion is configured to be mounted on a top surface of a side wall or rail of the truck bed. Beneath the base portion is a buffering member 30 that can take any suitable form that protects the finish of the truck from damage caused by the load carrier's installation and use thereupon. The load supporting portion can optionally comprise a crossbar 37 that will serve as a receiver for cargo carrying boxes, sports equipment carrying arrangements and other accommodating structures which may be desirably utilized for purposes of load carrying.

In this exemplary embodiment, the elevating structure includes two substantially upright members 45 that are associated with one another in a way that permits them to be slidably movable with respect to each other. In the preferred embodiment, this is a telescoping arrangement. In the illustrated case, this configuration of the elevating structure permits expansion and contraction of the elevating structure that corresponds to raised and lowered configurations of this portion of the load carrier.

The assembled telescoping arrangement generally takes the form of an exterior sleeve 47 or tube positioned around an interior or extension tube 49. A fastening connection is made between the base portion and the telescoping arrangement. In order to provide more fortitude and rigidity to the assembled arrangement, a substantially square or rectangular adjunct tube 46 is provided in parallel with, and connected along a substantial length of the exterior sleeve tube. This rectangularly shaped tube provides reinforcement to the exterior sleeve, as well as provides a better shape for accomplishing the necessary connection to the base portion of the carrier. Still further, an inclined side brace 48 is shown connected between this reinforcing tube and the base portion.

Figure 1:
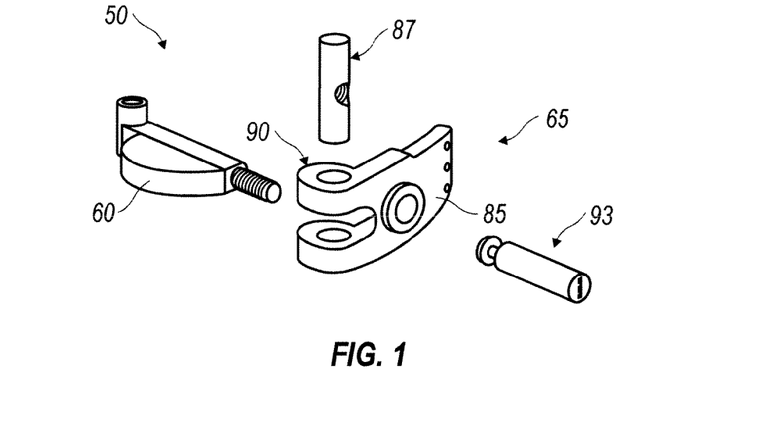
Figure 2:
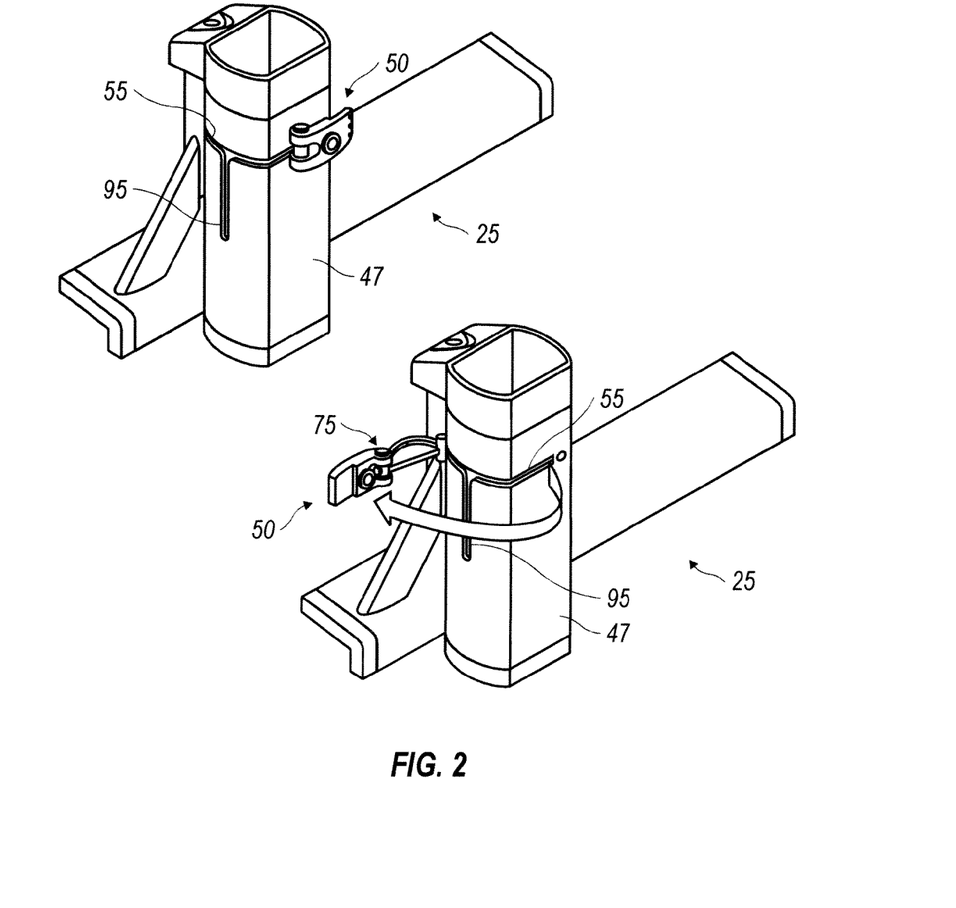

Referring to FIGS. 1 and 2, details of a fixing device 50 are shown that is utilized for fixing the orientations of the upright or telescoping members in desired configurations. As may be best appreciated in FIG. 1, the fixing device includes on its left-hand side a blocking member 60 that is coupled to a take-up arrangement 65 that is shown on the right hand side of the drawing. FIG. 2 shows at the left-hand side the fixing arrangement in a blocking and tightened configuration, while the right hand configuration shows the fixing device in a released and disengaged configuration.

In practice, each of the two telescoping members are each provided with substantially horizontally oriented side slots 55 cut thereinto that can be aligned between the two members for registration one with another. When such alignment or registration is achieved, the blocking member, which is pivotally connected to the elevating structure, can be moved into an inserted engagement within a pair of aligned slots. In this manner, relative movement between the two telescoping members is prevented. The use of this blocking member can be thought of as a macro adjustment that substantially prevents relative movement between the two telescoping members, but not absolute prevention.

The take-up arrangement which is pivotally connected to the blocking member provides final securement for more absolute fixation of the two telescoping members, one to the other. This is accomplished primarily through a squeezing or contraction function that presses the outer (exterior) sleeve into a friction engagement with the inner tube (sleeve). The take-up arrangement includes an actuator 85 taking the form of an operator graspable handle or lever member that has a cam surface 90 generally arranged around the pivot axis 75 of the lever's connection to the blocking member. An axle for rotation of the handle is provided via a barrel nut 87 that is connected to a threaded T-pin co-joined with the blocking member. When the blocking member is properly inserted into the aligned slots of the telescoping members, the cam surface of the lever handle is in abutment with an exterior surface of the outer sleeve tube. Operator pivotation of the lever causes a take-up function as the cam surface acts by pressing and squeezing on the outer sleeve tube. An over-center configuration of the cammed handle permits a releasable locking of the take-up arrangement when the lever is rotated around so that an interior surface thereof fits flush against the exterior surface of the sleeve tube. The keyed lock arrangement 93 permits securement in the tightened configuration thereby preventing unauthorized manipulation.

In order to facilitate contraction of the sleeve tube about the inner tube, an elongate longitudinal slot 95 is advantageously provided in the outer sleeve in the portion of the sleeve positioned adjacent to the fixing device. This slot facilitates a degree of resilient collapse of the outer sleeve inwardly toward the inner tube. As illustrated in FIG. 2, the blocking device when installed into the receiving slots of the telescoping members spans this longitudinal slot in the outer sleeve.

Figure 5:
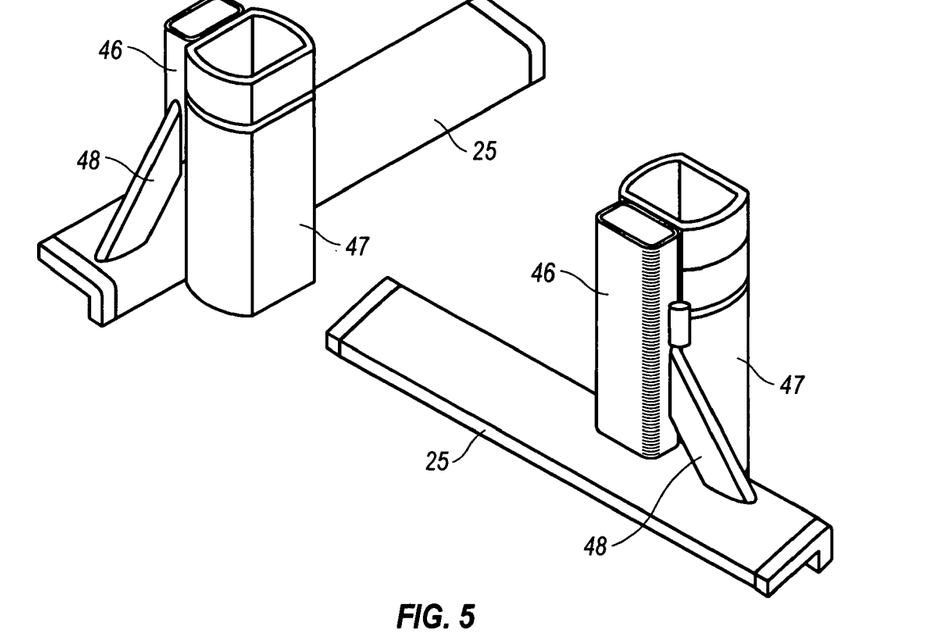

FIG. 5 shows the outer sleeve of the telescoping arrangement fastened to the base portion that rests upon the top surface of the side wall of the pickup truck. Exemplarily, connections between the outer sleeve, the base portion, and the reinforcing inclined brace are affected by welding. It should be appreciated, however, that other suitable methods for connection can be utilized.

Figure 6:
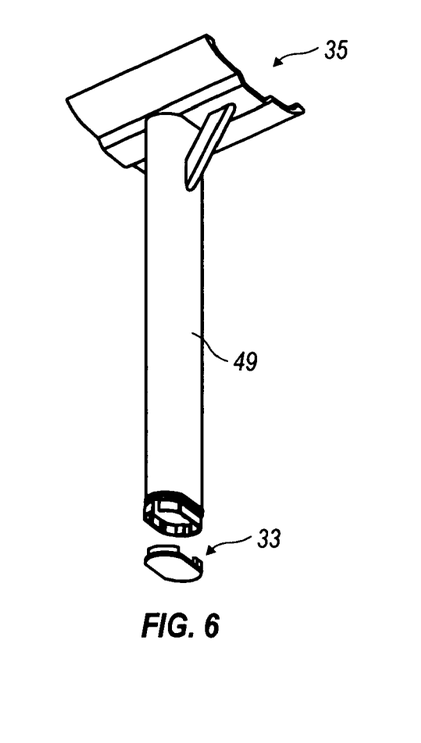

FIG. 6 shows an extrusion manufactured inner tube that is configured for sliding telescopic arrangement within the outer sleeve. A receiver is shown at a top end of the inner tube configured for receiving a cross bar installable thereupon. This receiver is also fortified with a welded support brace. At the bottom of this inner tube is a finishing cap. In both FIGS. 5 and 6 the receiving slots intended to be aligned for fixing the relative position of one telescoping tube to the other when the blocking member is inserted therein are shown. The outer sleeve shown in FIG. 5 has a single receiving slot while the inner tube of FIG. 6 shows two side slots; an upper slot corresponding to a fixed down or contracted configuration when aligned with the single slot of the exterior sleeve, and a lower slot corresponding to a fixed raised or expanded configuration when aligned with the slot of the exterior sleeve.

Figure 7:
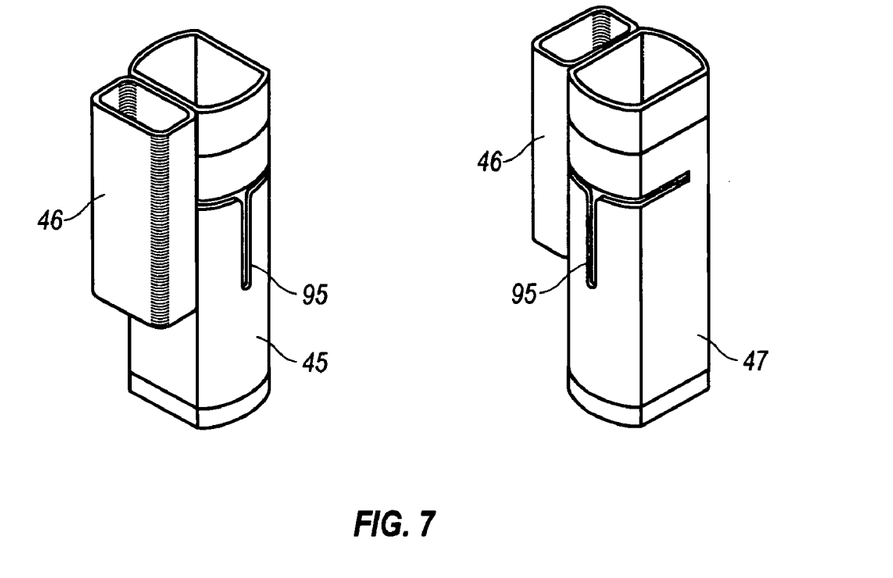

FIG. 7 shows details of the outer sleeve portion of the upright telescoping arrangement. The orientations of the adjunct square or rectangle tube that is mounted upon the outer sleeve is shown in substantial detail.

Figure 8:
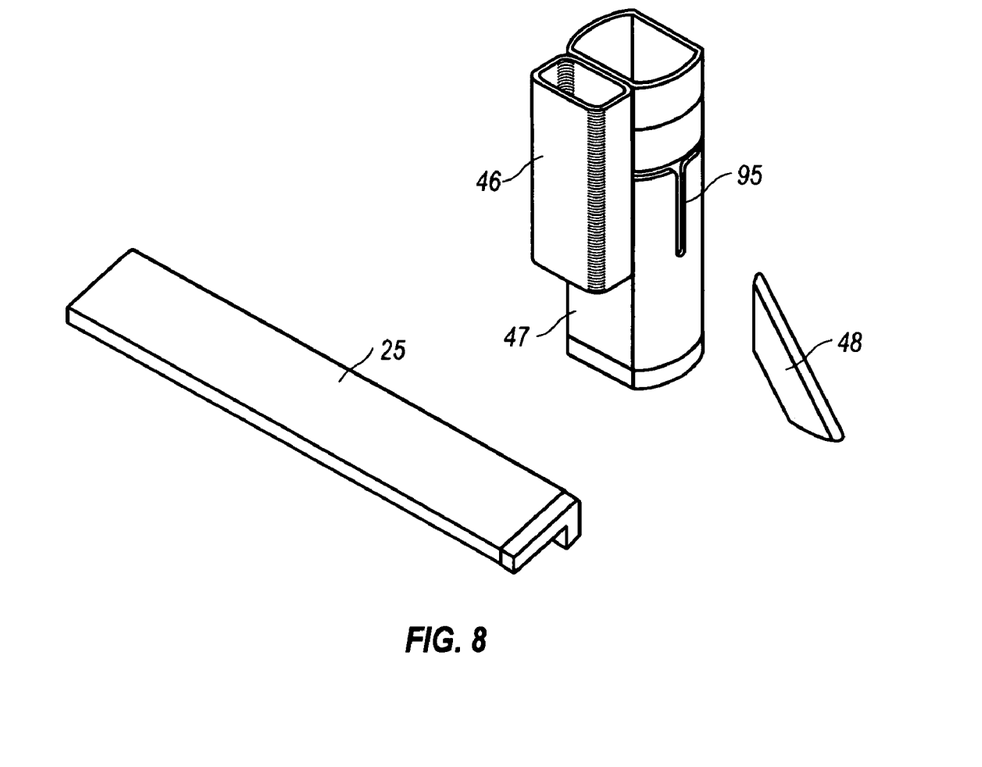

FIG. 8 shows a disassembled outer sleeve positioned for fixation with the base portion and reinforcing brace.

Figure 9:
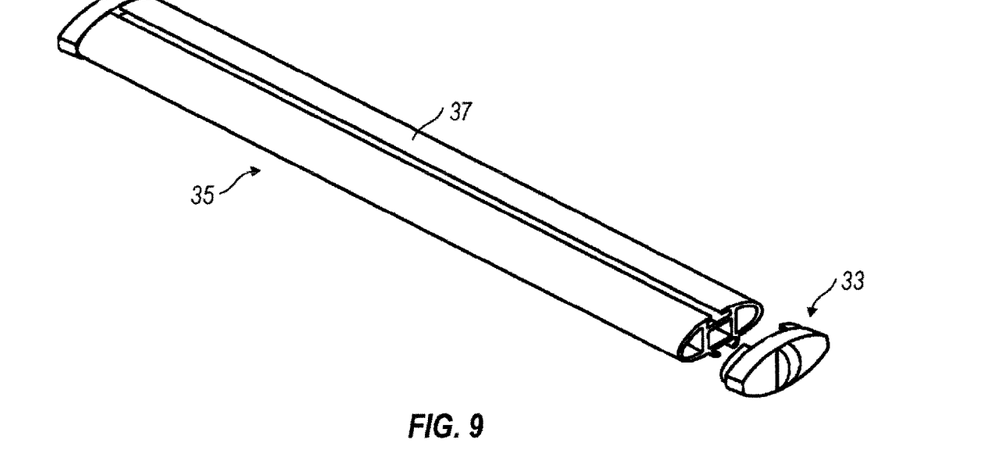

FIG. 9 shows an exemplary cross or load bar that can be installed between two elevating structure's; one configured as shown in FIGS. 2-4 and the other configured as a mirror image thereof. It should be appreciated that the load bar can take any number of typical configurations such as round- and square-shaped tubulars, as well as the more aerodynamic configuration shown in the illustration. Load bar caps 33 are also shown in FIG. 9 as finishing elements to the ends of the load bar.

Figure 10:
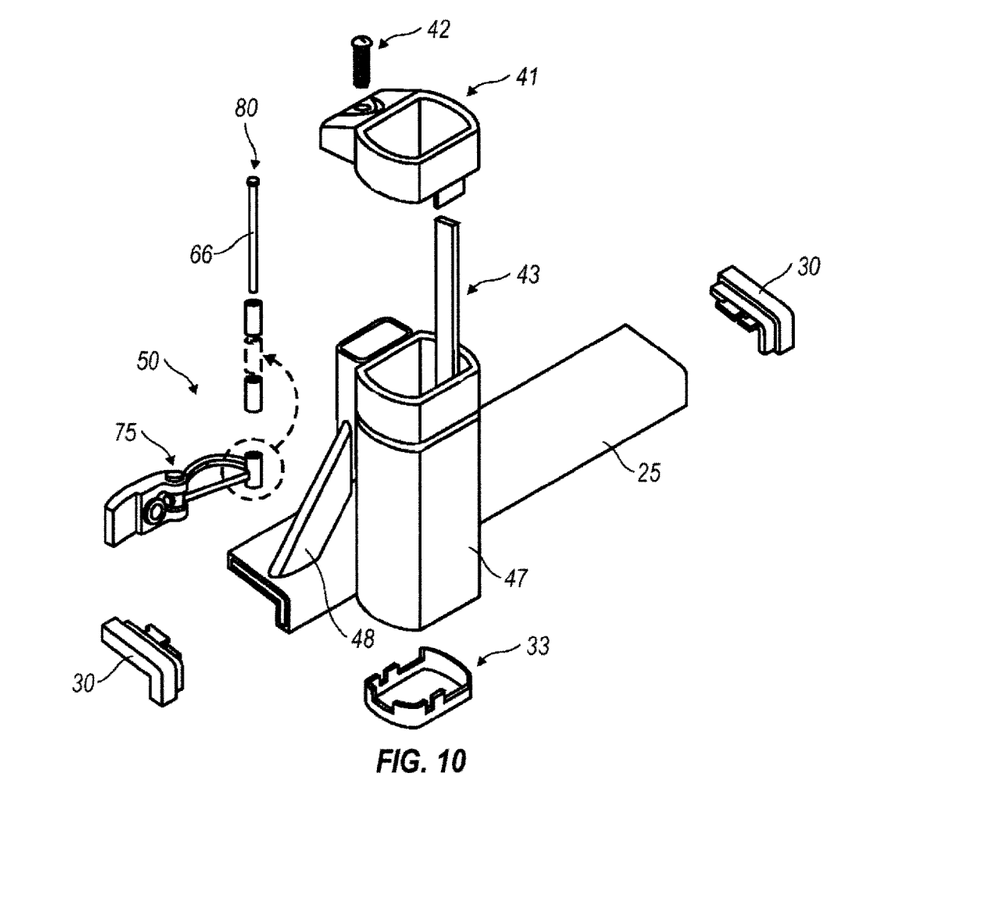

FIG. 10 shows and exploded assembly view of the outer sleeve mounted on the base portion with accompanying accessories also shown. This includes the take-up device described herein as well as end caps for both the base portion and the upright outer sleeve. A glide spring 43 is also shown that serves to act as an additional take-up device between the outer sleeve and inner tube, as well as a substantially vertical oriented pin 66 that acts as the pivot axle for the blocking member. There is also a securing bolt 42 shown for releasably attaching the top extrusion 41 to the outer sleeve. When the fixing device is fully secured, it is contemplated that portions of the outer sleeve and inner tube will be pressed directly against one another, but it is also intended that engagement portions of the caps to the outer sleeve may also provide engageable surfaces for abutment with the inner tube.

Figure 11:
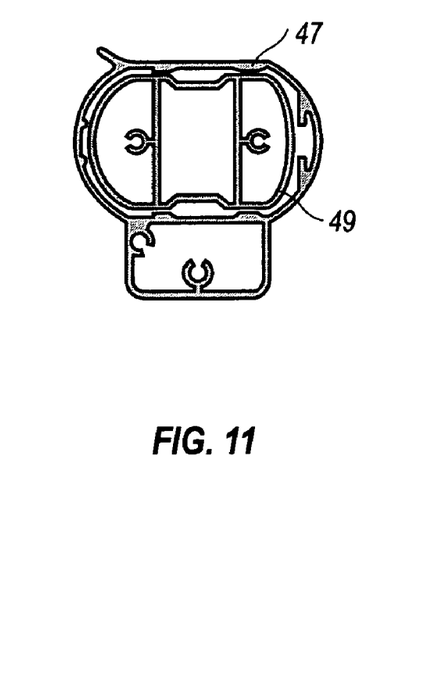

FIG. 11 shows a cross-sectional view of the telescopically arranged elevating structure with the inner tube (inner vertical extrusion) 49 slidingly installed within the outer sleeve (outer extrusion) 47. Contact or high points are shown between the two tubes for accomplishing frictional abutment therebetween. The adjunct square tube 46 fastened to the outer sleeve is also shown.

Figure 12:
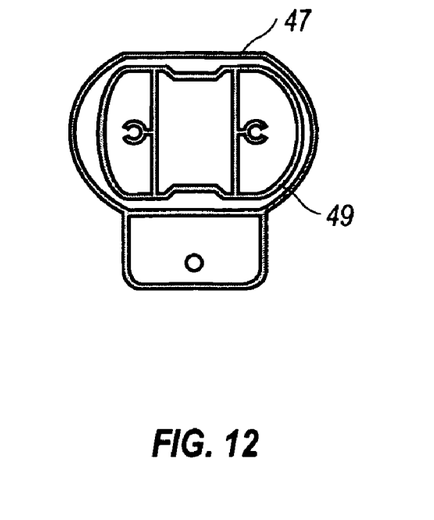

FIG. 12 illustrates bearing glide surfaces that are provided upon the outer extrusion sleeve 47 for engagement with the inner extrusion tube 49. It is anticipated that the pressure between these glide surfaces and the inner tube will be sufficiently large to act as guides for reciprocation of the inner tube within the outer sleeve tube, but it will be small enough to be easily overcome by operator manipulation.

Figure 13:
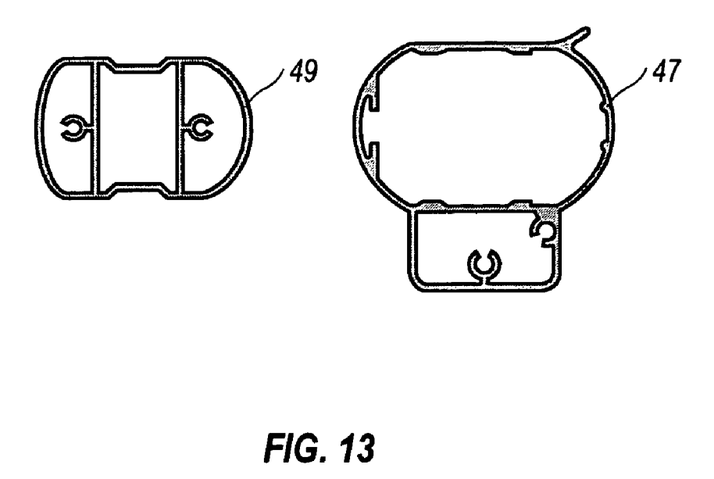
Figure 14:
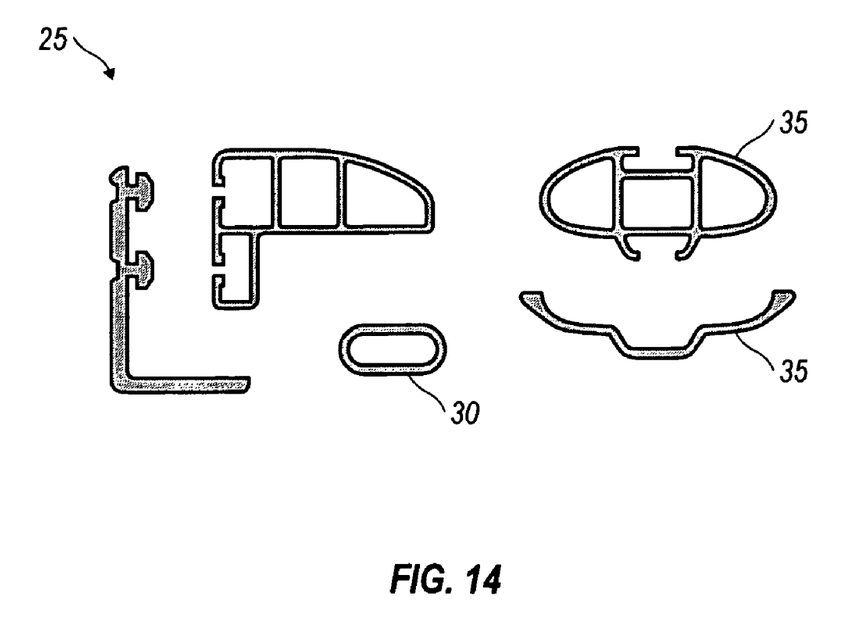

FIG. 13 cross-sectionally illustrates an exemplary configuration of an inner sleeve 49 and an outer sleeve 47 separated from one another. FIG. 14 illustrates various cross-sectional profiles of several components of the load carrier arrangement of the present invention including the base portion 25, associated buffer member 30 and two exemplary load supports 35, the top of which takes the form of a crossbar 37. It should be appreciated, however, that these specific arrangements are merely exemplary and are intended to provide example to those persons skilled in the relevant art of how the invention and its several aspects can be implemented.

The invention claimed is:

1. A load carrier arrangement for a truck bed, said arrangement comprising:
    an elongate elevating structure arranged between a base portion mountable to a truck bed and a load supporting portion, said elevating structure adapted to expand and contract between raised and lowered configurations, respectively;
    said elevating structure comprising two elongate and upright members relative to horizontal, and each of said two upright members are slidably moveable along an upright axis relative to the other for establishing said raised and lowered configurations;
    a fixing device releasably fixing said two upright members one to the other and thereby preventing expansion and contraction of said elevating structure, said fixing device including a blocking member pivotable about an axis parallel to said upright axis and pivotably insertible into and removable from slotted aligned receivers, one each of said slotted aligned receivers formed in each of said two upright members thereby blocking relative movement between said upright members; and
    said fixing device further comprising a take-up arrangement pivotally connected to said blocking member, said take-up arrangement having a pivot connection with said blocking member and configured to resiliently collapse at least one of said two upright members against the other when said blocking member is inserted into said slotted aligned receivers thereby forming a releasable friction fit therebetween.

2. The load carrier arrangement as recited in claim 1, wherein said two upright members form said releasable friction fit directly between one another.

3. The load carrier arrangement as recited in claim 1, wherein said aligned slotted receivers are horizontally oriented perpendicular to a longitudinal direction of the elongate elevating structure.

4. The load carrier arrangement as recited in claim 1, wherein said blocking member is pivotally connected to the elevating structure.

5. The load carrier arrangement of claim 1 wherein said blocking member has a substantially planar portion insertable into said aligned slots.

6. The load carrier arrangement as recited in claim 1, wherein said two upright members are telescopically arranged establishing two telescopic members with one at least partially positioned within the other.

7. The load carrier arrangement as recited in claim 6, wherein said fixing device further comprises a squeeze arrangement, said squeeze arrangement configured to constrict one of said two telescopic members about the other thereby forming a friction fit between said telescopic members.

8. The load carrier arrangement as recited in claim 7, further comprising:
  an elongate slot provided through an exteriorly positioned telescopic member of said two telescopic members, said elongate slot being configured to facilitate a constrictive biasing of said exteriorly positioned telescopic member toward an interiorly positioned telescopic member of said two telescopic members.

9. A load carrier arrangement for a truck bed, said arrangement comprising:
  an elongate elevating structure arranged between a base portion mountable to a truck bed and a load supporting portion, said elevating structure adapted to expand and contract between raised and lowered configurations, respectively;
  said elevating structure comprising two elongate and upright members relative to horizontal, and each of said two upright members are slidably moveable along an upright axis relative to the other for establishing said raised and lowered configurations;
  a fixing device releasably fixing said two upright members one to the other and thereby preventing expansion and contraction of said elevating structure, said fixing device including a blocking member insertible in aligned slotted receivers, one each of said aligned slotted receivers formed in each of said two upright members; and
  said fixing device further comprising a take-up arrangement, said take-up arrangement having an actuator pivotally connected to said blocking member at a take-up pivot connection and configured to resiliently collapse at last one of said two upright members against the other upon pivotation of said actuator when said blocking member is inserted into said slotted aligned receivers thereby forming a releasable friction fit therebetween wherein said blocking member is pivotably arranged with respect to said two upright members via a block-enabling pivot connection, said block-enabling pivot connection configured to permit transition of said blocking member between a blocking configuration wherein said blocking member is pivotably inserted into said aligned slotted receivers and a released configuration wherein said blocking member is pivotably removed from said aligned slotted receivers.

10. The load carrier arrangement as recited in claim 9, wherein said two upright members form said releasable friction fit directly between one another.

11. The load carrier arrangement as recited in claim 9, wherein said aligned slotted receivers are horizontally oriented perpendicular to a longitudinal direction of the elongate elevating structure.

12. The load carrier arrangement as recited in claim 9, wherein said blocking member is pivotally connected to the elevating structure.

13. The load carrier arrangement of claim 9 wherein said blocking member has a substantially planar portion insertable into said aligned slots.

14. A load carrier arrangement for a truck bed, said arrangement comprising:
  an elongate elevating structure arranged between a base portion mountable to a truck bed and a load supporting portion, said elevating structure adapted to expand and contract between raised and lowered configurations, respectively;
  said elevating structure comprising two elongate and upright members relative to horizontal, and each of said two upright members are slidably moveable along an upright axis relative to the other for establishing said raised and lowered configurations;
  a fixing device releasably fixing said two upright members one to the other and thereby preventing expansion and contraction of said elevating structure, said fixing device including a blocking member pivotable about an axis parallel to said upright axis and insertible into and removable from aligned slotted receivers, one each of said aligned slotted receivers formed in each of said two upright members; and
  said fixing device further comprising a take-up arrangement, said take-up arrangement configured to resiliently collapse at least one of said two upright members against the other when said blocking member is inserted into said slotted aligned receivers thereby forming a releasable friction fit therebetween and wherein said blocking member is pivotably connected to said take-up arrangement via a take-up pivot connection, said take-up pivot connection configured to permit pivotal transition of said take-up arrangement between an expanded and contracted configuration of said take-up arrangement.

15. The load carrier arrangement as recited in claim 14, wherein said actuator of said take-up arrangement includes an over-center cammed member that is operator-configurable between tightened and loosened configurations of said take-up arrangement.

16. The load carrier arrangement as recited in claim 14, wherein said two upright members form said releasable friction fit directly between one another.

17. The load carrier arrangement as recited in claim 14, wherein said aligned slotted receivers are horizontally oriented perpendicular to a longitudinal direction of the elongate elevating structure.

18. The load carrier arrangement as recited in claim 14, wherein said blocking member is pivotally connected to the elevating structure.

19. The load carrier arrangement of claim 14 wherein said blocking member has a substantially planar portion insertable into said aligned slots.

* * * * *